July 28, 1925.
P. A. POLTIN
MICROMETER
Filed Oct. 6, 1924
1,547,668
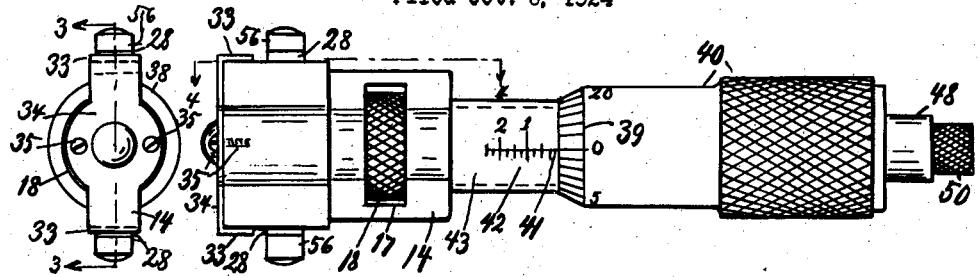
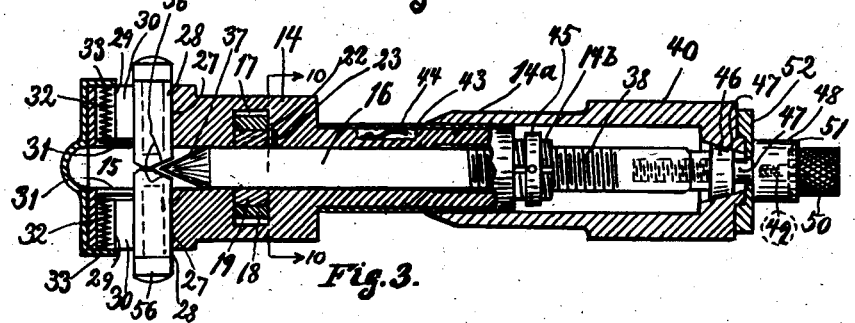
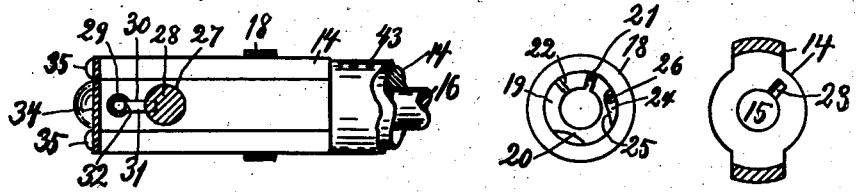
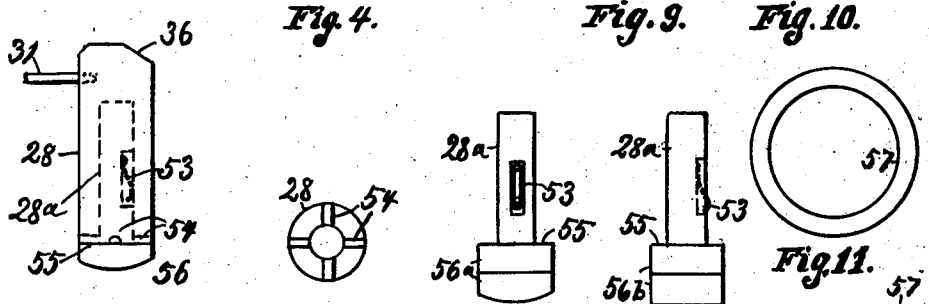
INVENTOR:
Paul A. Poltin
BY A. M. Carlsen
ATTORNEY.

Patented July 28, 1925.

1,547,668

UNITED STATES PATENT OFFICE.

PAUL A. POLTIN, OF ST. PAUL, MINNESOTA.

MICROMETER.

Application filed October 6, 1924. Serial No. 741,834.

*To all whom it may concern:*

Be it known that I, PAUL A. POLTIN, a citizen of the Republic of Germany, residing at St. Paul, in the county of Ramsey and State of Minnesota, have invented certain new and useful Improvements in Micrometers, of which the following is a specification.

My invention relates to micrometers for measuring inside diameters, and the object is to produce a micrometer of such novel and improved construction that it will measure very accurately even if made on a small scale as compared to micrometers heretofore used. This and other objects I attain by the construction and arrangement of parts illustrated in the accompanying drawing, in which,—

Fig. 1 is a side view of my improved micrometer.

Fig. 2 is a left hand end view of Fig. 1.

Fig. 3 is a section on the line 3—3 in Fig. 2.

Fig. 4 is a section on the line 4—4 in Fig. 1.

Fig. 5 is an enlarged detail view of one of the slides 28 in Fig. 3.

Fig. 6 is a face view of the lower end of the hollow slide member 28 in Fig. 5, the lower member or plug 28ª being removed.

Fig. 7 is the slide member 28ª in Fig. 5 but given a longer head.

Fig. 8 is the same as Fig. 7 but with a still longer head.

Fig. 9 is a right hand side view of the locking ring 18 in Figs. 1 and 3.

Fig. 10 is a section on the line 10—10 in Fig. 3, showing the surface of the frame facing the surface or parts shown in Fig. 9.

Fig. 11 is a face view of a caliber measuring ring by which to set the micrometer.

Fig. 12 is an edge view of Fig. 11.

Referring to the drawing by reference numerals, 14 designates the frame of the device. It has a longitudinal central bore 15 for a spindle 16 to slide in and a transversely arranged aperture 17 housing a locking collar 18, by the turning of which the spindle may be held firmly in any desired position, as will be understood from Figs. 9 and 10 which views show that within the collar 18 is a smaller collar 19 having a reduced portion 20 and a radial gap 21 allowing it to be sprung together tightly about the spindle. Said inner collar 19 also has a radial rib 22 arranged to engage in a cavity 23 in the frame (Fig. 10) and prevent rotation of the ring. Said ring has its outer face formed with a cavity 24 having a slanting bottom 25 for a roller 26 to roll on and wedge the ring 19 together with the contacting ring 18 when the latter is revolved toward the shallow end of the cavity.

In the head end of the frame are two radially aligned bores 27 for opposite radial slides 28, and forward of said bores are smaller radial bores 29 which are connected with the larger bores by slots 30. Each slide 28 has an arm 31 extending through the slot 30 into the smaller bore where it is constantly pressed toward the bore 15 by a coil spring 32 which is supported by an angular end portion 33 of a plate 34 secured by screws 35 and covering the end of the bore 15; and hence the springs tend at all times to push the slides 28 toward each other.

The inner ends of the slides are beveled at 36 from their centers toward the cone shaped end 37 of the spindle 16. The angle of said bevels and cones is fifty-three degrees, seven minutes and forty-eight seconds. This angle of the cone and forty threads to the inch on the threaded portion 38 of the spindle, and a circular scale 39 of twenty-five equal divisions upon the beveled end of the thimble 40 combine to secure a one-thousandth part of an inch variation between the outer ends of the slides 28 for each one of the twenty-five degrees of the scale 39 that passes the straight line 41 of scale 42 on a sleeve 43 which is rotatable on a reduced portion 14ª of the frame and is held frictionally by a spring 44. Said frame portion has its rear end 14ᵇ reduced in diameter, tapered outside and threaded inside and outside, and is slitted longitudinally and given a threaded collar 45 the turning of which will tighten it about the threaded portion 38 of the spindle sufficiently to take up wear of the screw.

The rear end of the spindle has a truncated cone-shaped head 46 fitting in a conical bore 47 in the rear end of the thimble 38. Into said rear end of the spindle is threaded a screw 47 whose head 48 has a stud with a thumb piece 50 rotatably mounted on it and given a yieldable ratchet mechanism 51 (which being well known is not here fully described). 52 is a washer helping to form connection between the screw-head 48, thimble 40 and spindle cone 46.

The device is so constructed that it may readily be made for smaller measures than has been possible with micrometers heretofore constructed. My device is particularly intended for, say one half to two inch diameters.

In Fig. 5 is shown that each slide 28, or at least one of them is composed of an outer hollow member 28 and an inner member 28ª adapted to be inserted in the hollow member and having a spring 53 holding it in place against accidental displacement. The outer end of the member 28 has several radial notches 54 (see Fig. 6) adapted to receive any dust found on the adjoining face 55 of the head 56 of the member 28ª, as the latter is rotated some after being inserted.

In Fig. 7 the member 28ª has a head 56ª twice as long as the head 56 in Fig. 5, and in Fig. 8 the head 56ᵇ is three times as long as head 56. Each additional length of the head is a multiple of the original head. For a medium size tool each additional extension may be a fourth of an inch long. This enables a small micrometer to measure also dimensions greater than the original tool is built for.

Figs. 11 and 12 show a hardened steel ring 57 having its inner face ground to an exact diameter of say either one or two inches.

In the use of the tool if it is assumed the minimum distance between the outer ends of the slides 28 to be about two inches, then the master gage or caliber ring 57 should be of exactly two inches inside diameter. The slides 28 are then adjusted by turning head 48 until the slides contact with the opposite points in the ring 57 and the mark at O on the thimble is turned into convenient view and the sleeve 43 turned with its line 41 into registering position with the mark O. This done the micrometer is ready to be used by turning of the thimble 40 with the fingers if the operator is a mechanic with good judgment as to the force he applies without injuring the instrument. If not of such judgment he should turn the thimble by the head 50 so that when the slides 28 reach the surface in the hole measured the spring-pressed ratchet 51 will yield and let head 50 turn without turning the thimble 40 and spindle 16. In the case of boring out a hole such as a cylinder, in a lathe, the micrometer is set in the manner described to the desired diameter and the cylinder bored to fit over the outer ends of the slides 28. A caliper is then adjusted by the micrometer and used to measure the diameter of the piston that is to go into the cylinder. By using the slide members Figs. 7 or 8 one simply adds one fourth, one half or three-fourths of an inch to the capacity of the device and thereafter uses the original parts for fine adjustment of the increased capacity as a whole.

What I claim is:

1. In a micrometer the combination of an elongated frame having a central longitudinal bore and a head with two opposite radial bores in it, a spindle slidable in the bore and having a portion threaded into a portion of the bore, and means at one end for rotating it, the other end being cone shaped at a certain angle, a pair of oppositely movable slides in the radial bores in the head of the frame and having beveled end portions arranged to be engaged by the opposite faces of the cone and their outer ends projected beyond the head to form the measuring points and springs arranged to constantly impel the slides toward the face of the cone and thus regulate the distance between the measuring points; said head of the frame having also smaller radial bores parallel to the slides and a slot connecting the small bore with the large one and each slide having a lateral arm extending through the slot into the small bore, and said springs being compression coil springs one in each of the small bores and pressing on the arm to impel the slide toward the cone, and means to retain the outer ends of the springs.

2. The structure specified in claim 1, said head of the frame having also smaller radial bores parallel to the slides and a slot connecting the small bore with the large one and each slide having a lateral arm extending through the slot into the small bore, and said springs being compression coil springs one in each of the small bores and pressing on the arm to impel the slide toward the cone, and means to resist the outer ends of the springs, said head having a closure secured over the end of the bore for the spindle and said closure having angular end portions forming the retaining means for the outer ends of the springs.

In testimony whereof I affix my signature.

PAUL A. POLTIN.